Patented Sept. 26, 1939

2,173,922

UNITED STATES PATENT OFFICE 2,173,922

TREATMENT OF WHEY

George C. Supplee, Bainbridge, N. Y., assignor to The Borden Company, New York, N. Y., a corporation of New Jersey No Drawing. Application December 18, 1936, Serial No. 116,479

15 Claims. (Cl. 99—57)

This invention relates to the treatment of whey for the recovery of the commercially useful products in it and to the products resulting therefrom.

In the manufacture of cheese and industrial casein there remains the by-product—whey— which contains practically all of the lactose originally present in the milk, a high proportion of the natural milk minerals, lactalbumin, and certain other constituents normally present in natural milk. The whey, containing from 5 to 6 per cent of solid matter, is universally recognized as having food value of merit. In many instances the available whey from cheese factories and other establishments is disposed of in an uneconomical manner which does not permit the full conservation and utilization of the inherent nutritive value of the product. The inconveniences of storing fluid whey, due to its perishability, are well known. It is also a well known fact that at certain periods of the year large volumes of whey are available at cheese factories or similar establishments, the disposal of which presents serious sanitary and economic problems from the standpoint of stream polution. Only a relatively small proportion of the available whey is used for the manufacture of milk sugar or is desiccated for the purpose of conservation and subsequently used as a food product.

In attempting to dry whey by the usual methods and apparatus used for drying milk by the double roller process (known as the Just process and described in Patent No. 712,545), certain difficulties are encountered due to the inherent characteristics of the whey when subjected to the heat of the drying cylinders. Raw or fluid whey has an average composition substantially as follows:

| | Per cent |
|---|---|
| Water | 93.89 |
| Solids | 6.11 |
| Protein matter | 0.83 |
| Lactose | 4.55 |
| Milk ash | 0.72 |

Whey of this average composition becomes very viscous on the drying cylinders as the water is evaporated from the surface of said cylinders as a consequence of the increasing concentration of milk sugar and other constituents. As the evaporation of water from the revolving cylinders is a continuous process the product becomes increasingly viscous as the water is dispelled. This increasing viscosity in turn retards the rate of evaporation. Under various conditions of operation of the drying apparatus it has been found impracticable or even impossible to reduce the whey to a water free basis. The water remaining in the whey is sufficient, in the presence of the heat of the cylinders, to hold the milk sugar in partial solution thus preventing a fully satisfactory and complete dehydration of the whey.

An object of this invention is to provide an improved method for handling the whey whereby these difficulties may be overcome. A further object is to provide an improved method for recovering milk sugar, water soluble vitamin, for example, lactoflavin and other water soluble ingredients of the whey. It is also an object of this invention to provide a new product from the treatment of whey. Other objects will become apparent.

In order to overcome the difficulties described above, I have found that if certain substances are added to the whey, it can be dried by the double roller process referred to above in a satisfactory manner. These substances are added, from the theoretical standpoint, for the purpose of introducing a number of minute interstices in the film of whey solids adhering to the drying cylinder during the final stages of desiccation. Such additions, made prior to applying the fluid whey to the drying apparatus, permit a more rapid evaporation of water from the thin films which adhere to the revolving cylinders. Such substances also change the ash to lactose ratio from that of the normal whey and thus facilitate drying, as will be described in greater detail. The addition of the substances, and in the manner to be mentioned hereinafter, creates in the viscous whey syrup film on the surface of the drying cylinder, a porous condition which facilitates evaporation of the water to a degree which permits complete or substantially complete drying of the mixture.

A specific example of my method involves the addition to 100 parts by weight of liquid whey, as derived from the manufacture of cheese or casein for industrial purposes, or from other sources, from about 3 to as high as about 12 parts by weight of water insoluble organic matter of a nitrogenous or carbonaceous nature or combinations of both these types of products. For illustration a low grade flour, finely ground wheat middlings, soy bean meal, peanut meal and similar products may be added to fluid whey and the mixture agitated to prevent settling or precipitation of the suspended matter. The agitation of the mixture in a suitable tank or container is maintained during the application of said mixture to the drying apparatus which may be the double roller desiccating apparatus referred to above operated at atmospheric pressure.

The desiccating apparatus is operated under the usual conditions prevailing during the drying of milk. For illustration, the drying cylinders are heated with steam at an internal pressure which may vary from 50 to as high as 75 or 80 pounds per square inch, with the speed of the rolls varying from as low as 6 to as high as 14 or 15 revolutions per minute, respectively. During operation in this manner that portion of the revolving heated cylinder upon which the film is undergoing final desiccation reaches temperatures varying from 235° F. to 265° F. or thereabouts and in some instances may reach a temperature as high as 275° F. immediately ahead of the knife edge which removes the desiccated film. With the operation of the apparatus within the variations of steam pressure, speed of rolls and roll surface temperature, as mentioned, as high as 800 to 1200 pounds of the fluid mixture may be applied to the apparatus per hour. The resulting desiccated product, which is scraped from the surface of the revolving cylinders in the same fashion as dried milk is prepared, is completely dried or substantially so as it leaves the drying cylinder. The dry film is readily pulverized by the same apparatus as used for pulverizing dry milk films. Such a product as just described resulting from the addition of 6% by weight of ground wheat middlings, based upon the weight of the whey, has the following composition:

| | Per cent |
|---|---|
| Moisture | 3½ to 4 |
| Grain solids | 48 |
| Whey solids | 48 |
| Whey protein | 6.48 |
| Milk sugar | 35.71 |
| Milk ash | 5.91 |

This product will also contain other inherent constituents of the whey and substances carried by the wheat middlings.

The process may also be carried out with whey which has been previously concentrated before adding the suspended ingredient and applying to the double roller drying apparatus. For illustration fluid whey irrespective of whether it is derived from cheese manufacture or from the production of industrial caseins, or from some other sources, may be first concentrated in a vacuum pan, for example, at a temperature of about 135° F., or any other appropriate device, to a concentration as high as about 73 per cent total solids; lower concentrations however are more appropriate for practical handling. The concentrated whey, preferably used at a concentration of from 35 to 50 per cent total solids, is heated in a tank or receptacle provided with the proper agitator and facilities for heating the mixture. The temperature may be raised to 150 to 160° F. and held for sufficient period of time to facilitate agitation and partial, or entire solution of such lactose as may have previously crystallized. It is immaterial whether all crystals of lactose are dissolved as long as the concentrated material has a fluidity which permits thorough mixing. To this concentrated whey there is added, on the basis of the original fluid whey solids, the carbonaceous or nitrogenous material previously mentioned, namely, wheat middlings, low grade flour, soy bean meal or similar products. From 3 or 4 to 12 pounds of said materials is added per each 100 pounds of fluid whey equivalent wherein such fluid whey equivalent is assumed to contain 6 per cent total solids or thereabouts. This mixture is thoroughly agitated and maintained under agitation during the time it is being applied to the desiccating apparatus. In employing the concentrated whey with additions of extraneous material as described the concentration of the whey-cereal mixture must be maintained sufficiently low to permit a fluidity of the mixture such that it will readily flow to the drying apparatus in the manner usually provided.

Such a mixture may be completely desiccated, or substantially so, by correlation of operating conditions in regard to steam pressure and speed of the rolls as previously mentioned for the drying of unconcentrated whey and cereal mixtures. In either case care should be taken not to subject the mixture to a temperature sufficiently high or for too long a time to totally gelatinize the starch.

Irrespective of whether unconcentrated, or partially concentrated whey is employed, the resulting dry product is ready for use with or without further pulverizing of the film and without the application of additional dehydrating or desiccating procedures.

Products as mentioned above and which contain, on the dry basis, varying proportions of whey solids and ground cereal grains obviously have valuable food properties for stock and poultry feeding purposes. Such mixtures are valuable as animal foods when used alone or as an ingredient of animal rations. The fact is obvious that the addition of such products to whey which permit its desiccation and conservation by relatively inexpensive methods and with standard desiccating equipment, permits an appreciable advancement in the practical utilization and conservation of the food elements contained in the whey. The specific methods and products as mentioned herein are not limited to the desiccation of whey for stock feeding purposes alone. The method may also be used for desiccating whey for human consumption wherein such substances as edible corn starch, or other similar cereal products suitable for human consumption are used. Also, if desired, the water soluble constituents of the dry powder may be separated by dissolving them in water.

The proportions of the added material to the whey solids may vary from the particular examples given. For example, the grain or cereal solids may be used in somewhat smaller proportions; also mixtures of various cereals or cereal derivatives may be used. Also, additional vitamins or vitamin-bearing substances may be added to the products described herein. For example, lactoflavin or any other flavin of the type generally known as lactoflavin but not restricted to that recovered from milk, may be added as a purified substance, as an impure concentrate, or in the form of high lactoflavin-bearing products. Likewise, rice polish or other substances containing active vitamins derived from rice polish or other suitable sources, as for example, wheat germ or wheat bran or the outer coating or aleurone layers, or germs of these or other cereal grains, may be added to the whey product dried as described above. The resulting product is of high nutritive value. In this way a product having a controlled or predetermined vitamin potency, particularly of the water soluble vitamin of the B— or G— complex, may be produced.

In another embodiment of my invention a water insoluble, inorganic filler may be added to the whey. For example, natural fluid whey as derived from the manufacture of cheese or industrial casein may be dried with the double cylinder drying apparatus referred to above by the addition of inorganic material which serves the purpose of expediting and facilitating the drying of the whey syrup film on the heated rolls in a manner analogous to that mentioned in the above methods wherein nitrogenous or carbonaceous matter was added to the raw whey.

Diatomaceous earth, fuller's earth, or clay of suitable characteristics, or ground chalk, are suitable for the purpose when added to the fluid whey in suitable proportion. For illustration, as little as approximately 4 pounds of the diatomaceous earth (such as Filter-Cel) by weight per one hundred pounds of whey may be added. It is desirable, from the standpoint of economy, to add as little of the inorganic filler as will permit proper desiccation and it is appreciated that larger amounts than given in the illustration may be used without objection from the standpoint of the desiccation operation per se. The Filter-Cel or other inorganic material is added to the whey under agitation and the agitation maintained during application of the mixture to the drying machine. The following is typical of various runs wherein whey was dried by the addition of Filter-Cel:

Fluid whey used 6,492 lbs.

Dry Flter-Cel used (approximately 4% by weight) 225 lbs.

Continuous drying period about 6 hours.

Average weight of fluid mixture applied to the drying machine per hour 1,118 lbs.

Internal steam pressure on drying cylinder 70-75 lbs.

Whey solids in the fluid whey (according to analysis) 396 lbs.

Actual poundage of dry mixture recovered 632 lbs.

Mechanical loss of solids 16 lbs.

The dry product as removed from the desiccating cylinders by the knife edge is not released as a continuous film as in the case of the solids of milk or the whey cereal mixture previously mentioned, but rather the desiccated product is removed as a dry powder or as irregular agglomerates slightly moist while hot at the instant of removal from the cylinder but which immediately dries in the air on cooling. The dryness of the powder released from the rolls depends upon the adjustment of the rate at which the fluid mixture is applied, the speed of the rolls and internal steam pressure. In order to maintain a uniform character of product as released by the knife uniform suspensions of the inorganic filler and fluid whey should be maintained by appropriate agitation and by appropriate rate of feeding the mixture to the drying machine. The relative composition of raw whey and the desiccated product prepared as above is shown by the following comparative analysis:

|  | Raw whey | Dry product |
|---|---|---|
|  | Parts | Parts |
| Salt | 6.11 | 96.22 |
| Water | 93.89 | 3.78 |
| Protein | 0.88 | 8.52 |
| Lactose | 4.55 | 44.46 |
| Total ash | 0.72 | 43.24 |

Partially concentrated whey may likewise be employed for preparing the dry product with Filter-Cel or its equivalent, wherein the ratio between the whey solids and the inorganic filler is maintained substantially within the range as cited for natural fluid whey. Insoluble organic materials may also be used in a similar manner.

The product as prepared above may be used not only as an ingredient of certain stock or poultry rations, but may also be used as a source of milk sugar.

For the manufacture of milk sugar the dry product prepared as in the above examples is mixed with hot water, temperature about 160 to 180° F., under agitation and for sufficient period of time to allow the sugar to dissolve. The mixture is then simply filtered and condensed to the desired degree. The use of this product for making milk sugar makes it unnecessary to carry out the preliminary treatment for the removal of milk albumin commonly employed in the usual processes for milk sugar manufacture. The heat of the drying cylinders coagulates the albumin to a degree which permits it to be filtered out readily with the diatomaceous earth of Filter-Cel.

A determination of the protein content of whey previously treated and filtered in the usual manner for the removal of albumin as usually practiced in the production of milk sugar showed a protein content of 0.330 per cent. This percentage of protein in the "albumin free whey" may be considered as a satisfactory standard. In order to ascertain whether the drying operation as described above was as effective in precipitating coagulable protein and removing it from the whey following dissolving and filtering, the protein content of such filtrate was determined and found to be, as an average of several samples, 0.332 per cent. By comparing this figure with the protein content of whey treated according to the common practice it is evident that the drying method followed by subsequent dissolving and filtration removes as much of the protein as the methods now used in the milk sugar manufacture.

The liquor or filtrate obtained from the dissolved desiccated product, upon condensing to a degree appropriate for the crystallization of the milk sugar contained therein yields a quality of milk sugar equivalent or even superior to the average commercial grade of what is generally known as crude or technical lactose.

The mother liquor obtained after crystallization of the lactose may be used for the recovery of vitamins and other materials inherent in the whey but completely conserved as a result of the initial drying operation with the inorganic filler, because appropriate grades of diatomaceous earth or Filter-Cel have but little or at the most relatively slight absorptive properties for the retention of such vitamin materials, particularly lactoflavin.

The dry product may even be used direct as a means for recovering vitamin materials inherent in the original whey, particularly lactoflavin by treating the dry product without previous removal of the lactose in accordance with appropriate methods or sequence of methods, such as that described in patent application Serial No. 61,890, filed February 1, 1936, "Concentration and isolation of water-soluble vitamins," Ansbacher, Supplee and Flanigan.

In another embodiment of my invention the substance added may be an ingredient of the whey, or certain ingredients soluble in the whey, whereby, for example, the ratio of protein to lactose or ash to lactose may be varied The reason for unsatisfactory results in the drying of natural fluid whey on the double roller desiccating apparatus referred to is due primarily to the concentration of natural inorganic salts found in the whey. These salts are apparently melassigenic, or molasses forming in that they retard or prevent crystallization or final dehydration of the milk sugar. The melassigenic character of certain of these natural milk minerals is further intensified at the relatively high temperatures to which the product is subjected in using the atmospheric double drum dryer. The nitrogenous or protein content of natural whey appears to be a factor of only secondary importance. The effect of the protein of the particular character found in the whey is primarily one of retarding rate of evaporation of the water in the whey syrup film on the heated cylinders rather than inherent non-drying properties of the protein itself. Runs have been conducted which show that when the protein to lactose or ash to lactose ratios are varied within certain limits by the addition of more lactose to the natural whey than is normally contained therein, such mixture may be dried in a satisfactory and commercially practical manner by the Just drying apparatus. This result seems to substantiate the viewpoint as expressed above to the effect that the inherent melassigenic effect of the natural minerals contained in whey is the primary cause of difficulties encountered in drying by the method in question.

It has been determined that whey may be completely desiccated on the Just double cylinder drying apparatus by appropriately adjusting the ratio of ash to lactose. In carrying out this method of desiccating whey, it is preferable, although not necessary, to use whey which has previously been concentrated to a total solids content of from 35 to 50 per cent, or thereabouts, before applying to the drying apparatus. Whey as derived from the manufacture of cheese or from the manufacture of industrial casein may be used wherein the inherent albumin remains in the whey or such whey may be used after removal of the albumin by heat coagulation.

In natural fluid whey or the solids thereof, the ratio of ash to lactose varies substantially within the range 1–6.2 to 1–10.7; within this range of ash to lactose ratios the protein to lactose ratio varies from 1–5.4 to 1–18.7, depending upon whether the whey is derived from cheese manufacture or the manufacture of industrial casein, and further depending upon whether the albumin has been removed from the whey. Wheys with ash to lactose and concurrent protein to lactose ratios as mentioned above are not successfully dried to completion on the double roller apparatus. However, when lactose of either refined or semi-refined grade is added to wheys of above character in an amount which substantially changes the ash to lactose ratio, successful drying is accomplished.

Specific illustrations of this embodiment of the invention follow: To whey derived from industrial casein manufacture there is added 6 lbs. of lactose per hundred pounds of whey. This mixture is concentrated in a vacuum pan to a total solids content of 50 to 55 per cent. The resulting concentrated mixture is then applied to the desiccating machine while hot, either with or without complete solution of the lactose, but with a degree of fluidity which permits flowing to the machine in the usual manner. The drying machine is operated with an internal steam pressure of 65 to 75 lbs. on the cylinders revolving at a speed of 4½ to 6 revolutions per minute. Complete drying of the mixture is accomplished resulting in removal of a dry product by the knife edge. The ratio of ash to lactose which permits this practical drying to completion is substantially 1–14.6.

Various other runs have been conducted wherein the ratios of ash to lactose, brought about by the addition of appropriate amounts of lactose to the fluid whey have been 1–14.9; 1–44.5; 1–15.8; 1–43.8. In all cases where the ash to lactose ratio was one to about fifteen or more, successful drying to completion was accomplished. The internal steam pressure and the speed of revolutions of the drying cylinders was in all cases maintained between 65–80 lbs. and 4½–6½ revolutions per minute, respectively.

The concurrent ratio of protein to lactose in the various mixtures varied from 1–15.6 to 1–101. This evidence seems to indicate, in confirmation of statements previously made herein, that the radio of ash to lactose is the primary condition determining whether successful drying to completion is accomplished. It is indicated that the critical ash to lactose ratio is in the neighborhood of 1–15; it is also indicated that the protein to lactose ratio may be variable and without substantial effect or importance, per se, in determining degree and completion of drying.

Various embodiments have been included in this description as illustrative of my invention. It is not intended, however, to restrict the invention to the particular illustrations given, it being apparent that variations may be made in utilizing it in varying degrees and under different circumstances. It is also obvious that mixtures of two or more of the various substances named may be added to the whey.

Also, particular reference has been made to the double cylinder drying apparatus (Just) in which the milk or fluid mixture is subjected to a temperature of about 212° F. for about 2 or 3 minutes before forming the film on the revolving drum and while on the drum the film is progressively subjected to temperatures of about 240 to 256° F. during a period of about 2 to 3 seconds, as a means and method for drying the product, but it is aparent that other processes and apparatus for drying may be used and it is not intended to restrict the invention to the particular illustrative example. The terms used in describing the invention have been used in their descriptive sense and not as terms of limitation and it is intended that all equivalents thereof be included within the scope of the appended claims.

I claim:

1. In the drying of whey by the drum process, the steps of adding to the whey an organic water-insoluble, nongelatinized substance of the class consisting of grain middlings, grain flour, soya bean meal, peanut meal and similar substances, agitating the mixture to maintain the added substance in suspension and drying the whey with the added substance by flowing the mixture in a fluid condition upon a drying cylinder and heating it thereon to a temperature above about 200° F.

2. In the drying of whey by the drum process, the steps of adding to the whey 3 to 12%, based on the weight of the whey, of a nongelatinized substance of the class consisting of ground grain products, ground soya bean products and ground peanut products, agitating the mixture, drying it by flowing it in a fluid condition upon a drying cylinder heated by steam at an internal pressure of about 50 to 80 pounds per square inch and rotating at a speed of about 6 to 15 revolutions per minute and scraping the dried product from the cylinder.

3. In the drying of whey by the drum process, the steps of adding to the whey 3 to 12%, based on the weight of the whey, of a nongelatinized substance of the class consisting of ground grain products, ground soya bean products and ground peanut products, agitating the mixture, drying it by flowing it in a fluid condition upon a drying cylinder heated to such a temperature and rotated at such a speed as to give a final desiccation temperature of about 235 to 275° F., and thereupon scraping the dried product from the cylinder.

4. In the recovery of milk products, the steps of adding to whey a diatomaceaus earth and desiccating the whey with the added diatomaceous earth by flowing the mixture in a fluid condition upon a drying roller and heating it thereon above about 200° F.

5. In the recovery of milk products, the steps of adding to whey about 4%, based upon the weight of the whey, of diatomaceous earth, agitating the mixture to maintain the diatomaceous earth in suspension, and desiccating the whey with the diatomaceous earth suspended in it; by flowing it in a fluid condition upon a drying cylinder and heating it thereon to a temperature above about 200° F.

6. In the recovery of milk products, the steps of adding to whey a diatomaceous earth, desiccating the whey with the added diatomaceous earth, by flowing it in a fluid condition upon a drying cylinder and heating it thereon to a temperature above about 200° F. and dissolving the water-soluble substances out of the dried mixture.

7. In the recovery of milk products, the steps of adding to whey a diatomaceous earth, desiccating the whey with the added diatomaceous earth, by flowing it in a fluid condition upon a drying cylinder and heating it thereon to a temperature above about 200° F., dissolving the water-soluble substances out of the dried mixture and separating the milk sugar from the water solution.

8. In the recovery of milk products, the steps of adding to whey a diatomaceous earth, desiccating the whey with the added diatomaceous earth, by flowing it in a fluid condition upon a drying cylinder and heating it thereon to a temperature above about 200° F., dissolving the water-soluble substances out of the dried mixture and separating the lactoflavin from the water solution.

9. In the recovery of milk products, the steps of adding to whey a water-insoluble, nongelatinized, anti-melassigenic, inorganic substance, desiccating the whey with the added substance by flowing it in a fluid condition upon a drying cylinder and heating it thereon to a temperature above about 200° F. and separating lactoflavin from the dried material.

10. In the recovery of milk products, the steps of adding to whey a water-insoluble, nongelatinized, anti-melassigenic, inorganic substance, desiccating the whey with the added substance, by flowing it in a fluid condition upon a drying cylinder and heating it thereon to a temperature above about 200° F., separating lactoflavin and dissolving water-soluble substances from the dried mixture.

11. In the drying of whey by the drum process, the steps of adding to the whey about 3 to 12%, based upon the weight of whey, of a non-gel-forming, nongelatinized, water-insoluble, anti-melassigenic substance and desiccating the whey with the added substance by flowing it while fluid upon a drying cylinder and heating it to a temperature above about 200° F. on the drying cylinder.

12. In the drying of whey by the drum process, the steps of adding to the whey about 3 to 12%, based upon the weight of whey, of a water-insoluble, non-gel-forming, nongelatinized, anti-melassigenic substance adapted to increase the proportion of ash to the other ingredients of the whey and drying the whey with the added substance by flowing the mixture in a fluid condition upon a drying cylinder and heating it to a temperature above about 200° F. on the drying cylinder.

13. In the drying of whey by the drum process, the steps of adding to the whey an organic, non-gel-forming, nongelatinized, water-insoluble, anti-melassigenic substance adapted to give porosity to the drying film and desiccating the whey with the added substance by flowing it in a fluid condition upon a drying cylinder and subjecting it to a temperature above about 200° F. on the drying cylinder.

14. In the drying of whey by the drum process, the steps of adding to the whey about 3 to 12%, based upon the weight of whey, of an inorganic, nongelatinized, water-insoluble, anti-melassigenic substance and desiccating the whey with the added substance by flowing it in fluid condition upon a drying cylinder and subjecting it thereon to temperatures above about 200° F.

15. In the drying of whey by the drum process, the steps of adding to the whey a non-gel-forming, nongelatinized, water-insoluble substance adapted to alter the proportions of ash to the other ingredients of the whey; desiccating the whey with the added substance by flowing it onto a drying cylinder and heating it thereon to a temperature above about 200° F. and dissolving the water-soluble substance out of the dried mixture.

GEORGE C. SUPPLEE.